United States Patent

Houmand

[11] Patent Number: 5,471,257
[45] Date of Patent: Nov. 28, 1995

[54] BENT-WIRE SPECTACLE FRAME

[76] Inventor: Jan Houmand, 27-29, Studiestræde, DK-1455 København K, Denmark

[21] Appl. No.: 50,160

[22] PCT Filed: Oct. 22, 1991

[86] PCT No.: PCT/DK91/00322

§ 371 Date: Apr. 26, 1993

§ 102(e) Date: Apr. 26, 1993

[87] PCT Pub. No.: WO92/08158

PCT Pub. Date: May 14, 1992

[30] Foreign Application Priority Data

Oct. 25, 1990 [DK] Denmark .................................. 2572/90

[51] Int. Cl.⁶ .................................................... G02C 1/08
[52] U.S. Cl. ............................. 351/86; 351/83; 351/103; 351/110
[58] Field of Search ...................................... 351/109, 108, 351/110, 140, 104, 105, 106, 103, 141, 51, 52, 83, 86

[56] References Cited

U.S. PATENT DOCUMENTS

| | | | |
|---|---|---|---|
| 2,458,963 | 1/1949 | Stevens | 351/105 |
| 2,880,649 | 4/1959 | Eisler | 351/110 |
| 5,177,510 | 1/1993 | Peters et al. | 351/45 |

FOREIGN PATENT DOCUMENTS

| | | |
|---|---|---|
| 1121696 | 8/1956 | France . |
| 343622 | 1/1921 | Germany . |
| 3857489 | 11/1989 | Japan . |

Primary Examiner—William L. Sikes
Assistant Examiner—Hung Xuan Dang
Attorney, Agent, or Firm—Browdy and Neimark

[57] ABSTRACT

A spectacle frame is fabricated by bending a piece of wire. The bends include eyelets or loops which are sized to accept therethrough the threaded shanks of plastic screws, but to stop the screw heads. The screws are passed through the eyelets and threaded into mating threaded holes in plastic lenses to attach the lenses onto the wire.

7 Claims, 2 Drawing Sheets

BENT-WIRE SPECTACLE FRAME

FIELD OF THE INVENTION

The invention relates to spectacles having two lenses made of a plastic material and each connected to a temple by means of a temple mounting member, and a bridge interconnecting the lenses, the temples, the temple mounting members and the bridge being made of wire material.

DESCRIPTION OF THE RELATED ART

Spectacles having rim parts made of wire material have per se been known for generations, both rimmed and in rimless design. This type of spectacles has, however, had a limited distribution particularly due to its fragility as concerns breaking or splitting of the lenses.

In a known design of rimless spectacles the temples are fastened to the lenses either by means of spring clamps placed on the circumference of the lenses as disclosed in U.S. Pat. No. 718,363, or by means of metal screws which are passed through holes in the lenses and are retained on the front side of the lenses either by nuts as disclosed in U.S. Pat. Nos. 906,360, 967,292 and 2,256,846 or in eylets formed by the interconnecting nose bridge as disclosed in DE patent No. 343622. However, these fastening methods all have the inherent disadvantage that even a minor deformation of the wire parts of the rim easily causes splits in the lenses at the spring clamps or around the screws passing through the lenses.

For spectacles with lenses of a thermoplastic material it has been proposed in French patent No. 1068345 to fasten a wire rim to a lens by pressing a heated profiled metal pin into the lens material. This fastening method is, however, not applicable for spectacles with lenses made of modern optical plastic materials.

Correspondingly, GB patent No. 760025 discloses a fastening method by which a pin of a yielding plastic material is passed through a pre-drilled bore in the lens and fastened by thermal expansion by heating or by pressing on the front side of the lenses. Besides the fact that this method in practice does not ensure a sufficiently firm fastening to prevent the lenses from working loose, the heat treatment requirement entails a considerable risk of damaging the surface treatment of the lenses.

During recent years the appearance of new and stronger wire materials such as, e.g. titanium alloys, has given rise to a renewed interest in wire-rimmed spectacles which can be produced with a considerably lower weight than conventional types of spectacles. EP-A-256098 proposes a different form of fastening, whereby the temple mounting members and the bridge serving to connect the lenses are shaped to form a resilient metal strap inserted with spring effect into rectangular slits in the lenses.

In practice it has appeared, however, that the arrangement of the resilient strap in the underdimensioned slits will easily cause the lens to break. If, in order to counteract this risk, the spring tension is reduced, the strap will tend to work itself loose and fall out.

SUMMARY OF THE INVENTION

The object of the invention is to provide an improved design of spectacles with wire temples and bridge, while fully preserving the advantages of this type of spectacles as concerns simplicity of structure and reduced weight, at the same time ensuring that the lenses and rim parts are held firmly together with a considerably reduced risk of breaking or splitting.

This can be achieved according to the invention by forming the temple mounting members and the bridge by at least one piece of wire material curved or bent to provide eyelets underlying the head of a screw, comprising a shaft of a yielding plastic material adapted for form-fit engagement with a threaded bore drilled directly in the lens between the front and back of same.

Fastening by means of screws adapted for engagement with threaded bores drilled directly in the lens entails a considerably reduced risk of local tensions around the fastening point, while at the same time the elastic deformability of the screw shafts contribute to absorb deformations and ensure a stable fixation. As compared to the above-mentioned embodiment which has a resilient strap, manufacture and mounting are simplified.

With the wire materials normally used for temples and bridges the eyelets underlying the screw heads can be formed with a diameter of about 2 mm, and by adapting the profiles of the screw it is expedient according to the invention that the plastic material is a transparent material, e.g. "grilamid".

The spectacle design according to the invention is applicable both to rimless spectacles where the temple mounting members can be made of short pieces of wire and for designs where the wire material also forms a rim portion connecting the bridge to the temple mounting members. According to the invention an embodiment of the latter type is characterized in that the temple mounting members and the bridge via connecting rim portions extending at least along part of the edge of each lens is made of a single piece of wire material.

Both for rimless and rimmed embodiments of spectacles according to the invention the advantage is obtained over conventional wire-rimmed spectacles that soldering joints which may weaken the structure are avoided.

In rimless spectacles an added safety for the firm retention of the screws in the lenses can be obtained by connecting each temple to a lens by means of separate mounting members made of wire material, one free end of which is bent to form an anchoring member for arrangement in a notch in the lens edge, whereas the other end forms a hinge joint for the temple.

BRIEF DESCRIPTION OF THE DRAWING

The invention is further explained in the following with reference to the drawing, in which.

DETAILED DESCRIPTION OF THE PREFERRED EMBODIMENT

Figure 1:
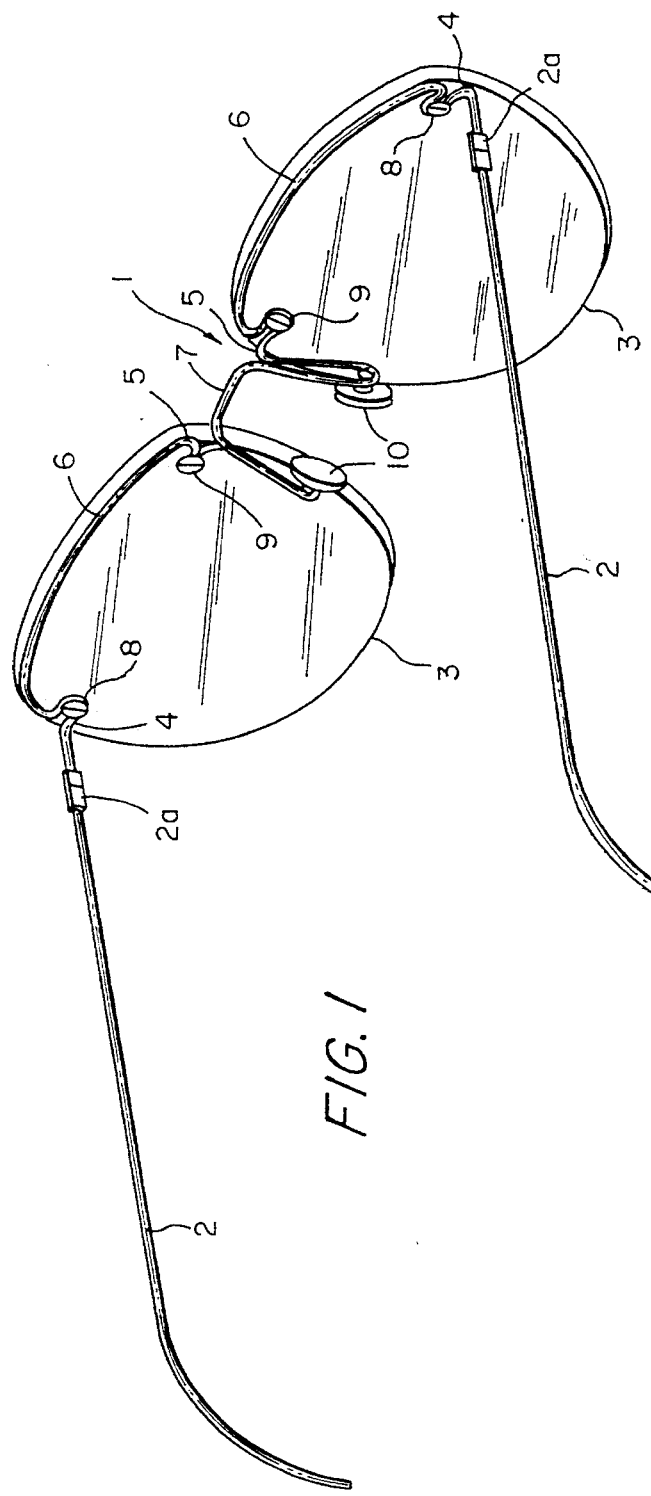
FIG. 1 shows an embodiment of spectacles with a wire material rim, which extends along part of the upper edge of the lenses.

In the embodiment of the spectacles 1 according to the invention shown in FIG. 1 the temples 2 are connected to the lenses 3, which in this embodiment are made of a plastic material, via hinge joints 2a by means of a rim formed by a single piece of wire material, mainly titanium wire, and providing for each of the lenses mounting eyelets 4 and 5 and a rim part 6 extending along the upper edge of the lens and connecting the eyelets 4 and 5, while a bridge 7 formed by the same piece of wire material connects the eyelets 5 connected with the two lenses.

The portion of the wire rim forming the bridge extends downwards along part of the inner edge of each lens and is bent into a hairpin shape for retention of nose pads 10.

Figure 3:
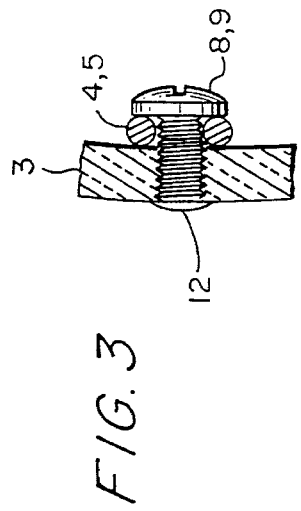
FIGS. 2–3 are a perspective, and a sectional view, respectively, of the details of the fastening of the lenses in the rim portions.
Figure 2:
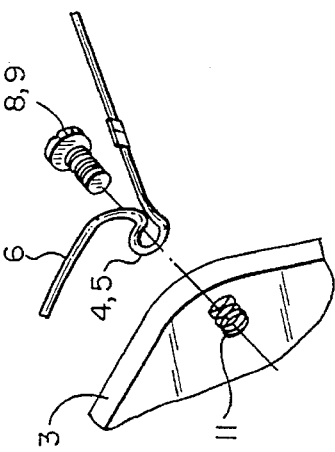

As more clearly apparent from FIGS. 2 and 3 the wire rim is connected to the lenses 3 by means of the eyelets 4 and 5 underlying heads of screws 8 and 9 which are screwed into threaded bores 11, drilled directly in the lenses 3, which with a view to the desired reduced weight are preferably made of an optical plastic materials such as, e.g. CR39.

As it appears from FIG. 3, the screws 8 and 9 are passed through the lenses 3. The screw end 12 at the front side of the lenses may be deformed, e.g. by being cut off to ensure a further safe fastening of the screw.

The screw being passed all the way through the lens and being made of a more yielding material than the latter it will be able to absorb deforming actions which are caused by exposing the wire rim to mechanical stress.

By using 1.1 mm titanium wire for the rim it will in practice be possible to provide the eyelets 4 and 5 with an interior diameter of 2 mm, and the screws 8 and 9 must then have dimensions adapted hereto, i.e. having a shaft diameter of 2 mm. For aesthetical reasons it is therefore preferred to use screws of a transparent material.

Figure 4:
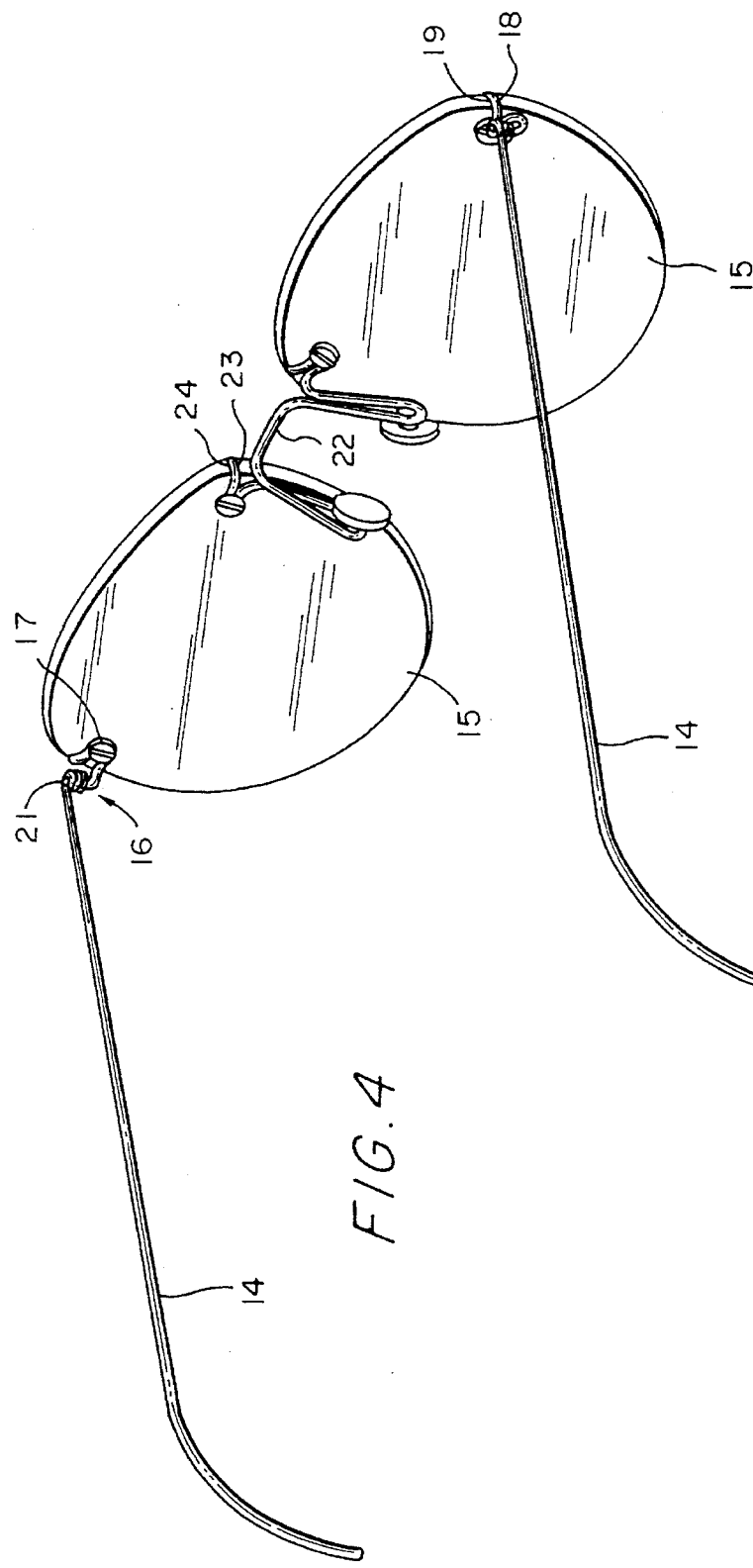
FIG. 4 shows a rimless embodiment.
Figure 5:
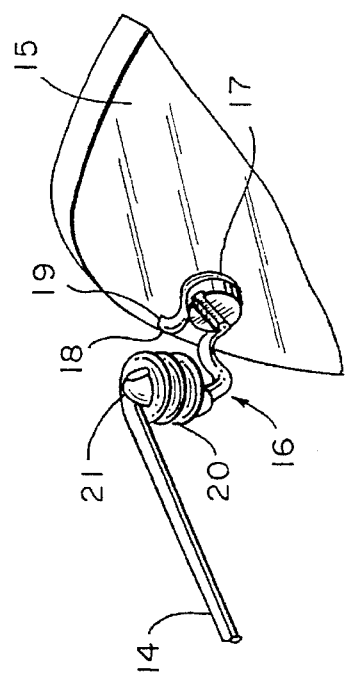
FIG. 5 shows a temple mounting member serving as hinge joint for a temple.

As shown in FIGS. 4 and 5 the spectacles according to the invention can also be provided in a rimless design by connecting the temples 14 to each of the lenses 15 by means of a separate mounting member 16 made of a piece of wire bent to form an eyelet 17. At one side of the eyelet 17 the mounting member 16 is bent so as to provide an anchoring member 18 for engagement with a notch 19 in the edge of the lens 15. At the opposite side of the eyelet 17 the mounting member 16 forms a hinge joint for the temple 14, e.g. by being shaped a hinge pin 21 encompassed by a wire winding 20 formed by the end of the temple 14.

The bridge 22, which in this embodiment is not connected to the mounting members 16, is also designed with bent ends to provide anchoring members 23 for arrangement in notches 24 in the edge of the lenses 15.

What is claimed is:

1. Spectacles having two lenses made of a plastic material and each connected to a temple by means of a temple mounting member, and a bridge interconnecting the lenses, the temples, the temple mounting members and the bridge being made of wire material, wherein the temple mounting members and the bridge are formed by a single common piece of wire material bent to provide eyelets for supporting the head of a screw, said screw comprising a shaft of a yielding plastic material adapted for form-fit engagement with threaded bore drilled directly in the lens between the front and back of same, opposite ends of said single piece of wire material being connected with said temples via hinge joints.

2. Spectacles as claimed in claim 1, wherein said screw is made of a transparent material.

3. Spectacles as claimed in claim 1, wherein the free end of the screw is deformed at the side of the lens opposite the screw head.

4. Spectacles according to claim 3, wherein said deformation is provided by cutting off said free end of the screw.

5. Spectacles having two lenses made of a plastic material and each connected to a temple by means of a separate temple mounting member, and a bridge interconnecting the lenses, the temples, the temple mounting members and the bridge each being made of a separate single piece of wire material, wherein the temple mounting members and the bridge are bent to provide eyelets for supporting the head of a screw, comprising a shaft of a yielding plastic material adapted for form-fit engagement with threaded bore drilled directly in the lens between the front and back of same, one free end of the wire material of each temple mounting member being bent to form an anchoring member arranged in a notch in the lens edge, whereas the other end forms a hinge joint for the temple.

6. Spectacles as claimed in claim 5, wherein the hinge joint is designed as a hinge pin encompassed by a bent end of the temple formed into a wire winding.

7. Spectacles as claimed in claim 5, wherein said screw is made of transparent material.

* * * * *